Figure 8:
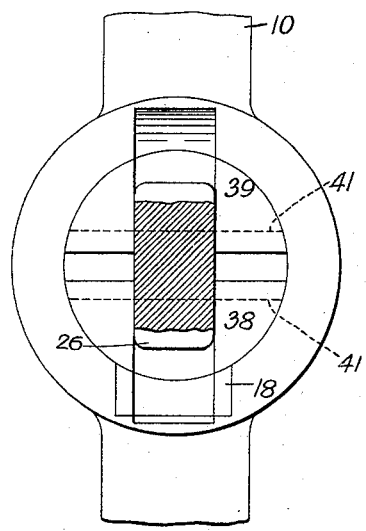
Figure 7:
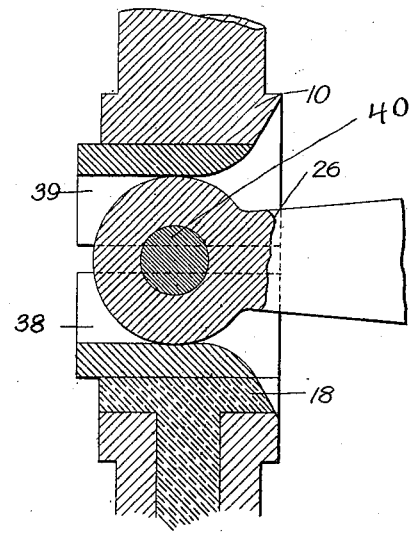
Figure 9:
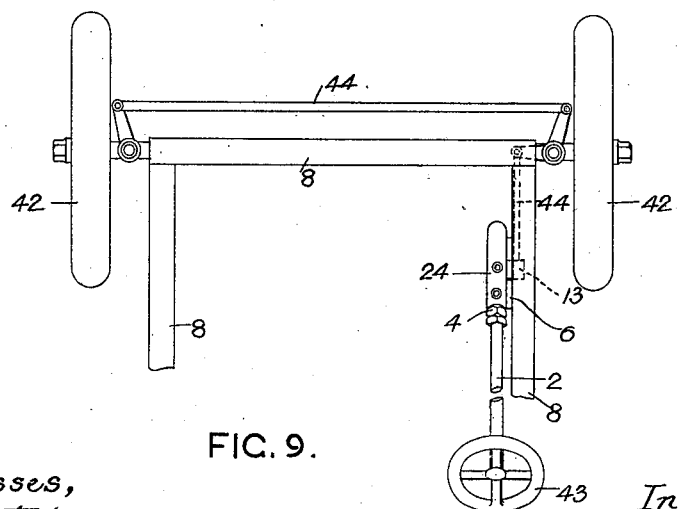

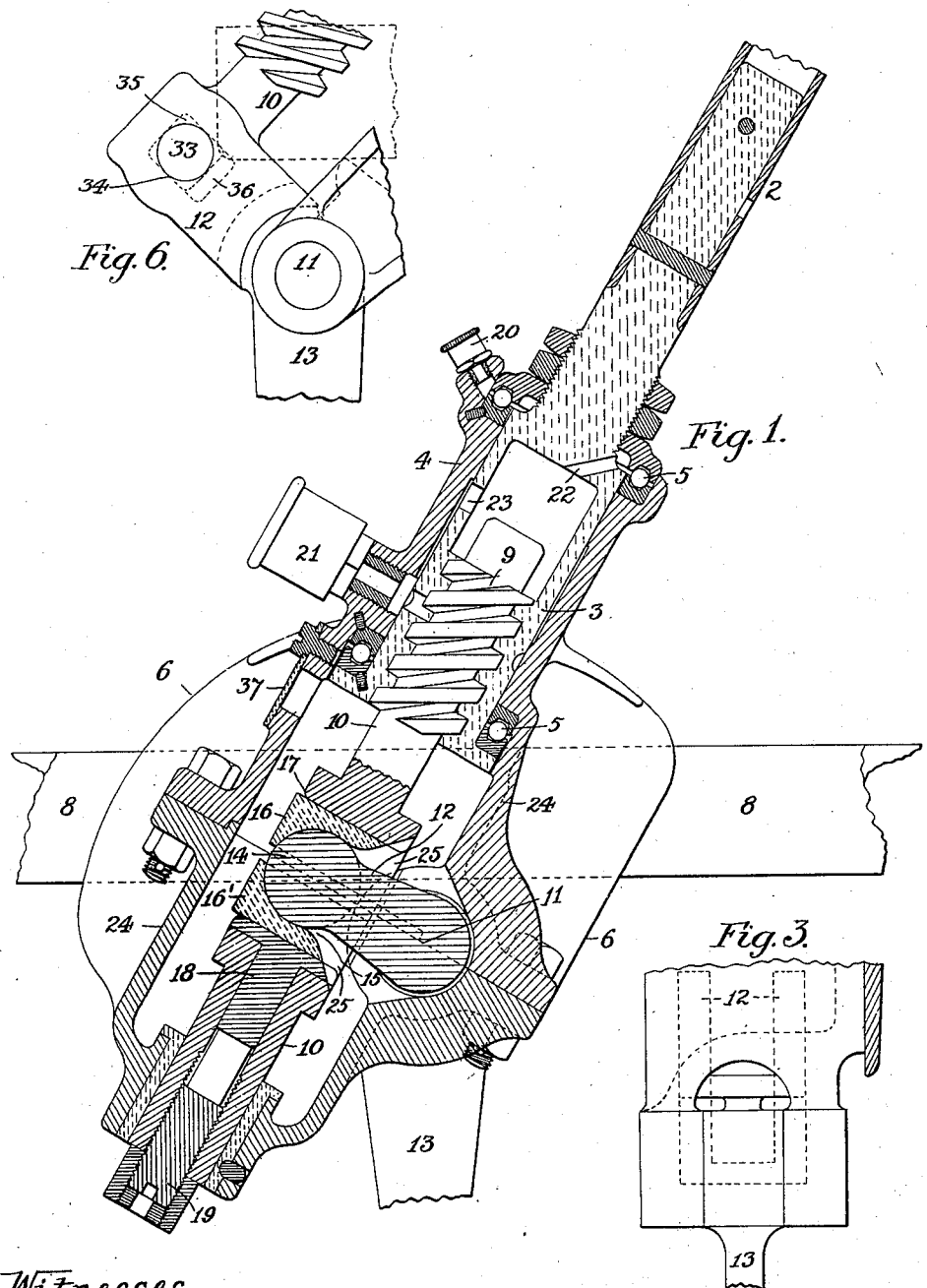

No. 754,068. PATENTED MAR. 8, 1904.
W. J. IDEN.
STEERING GEAR FOR MOTOR CARS.
APPLICATION FILED OCT. 13, 1902.
NO MODEL. 3 SHEETS—SHEET 2.
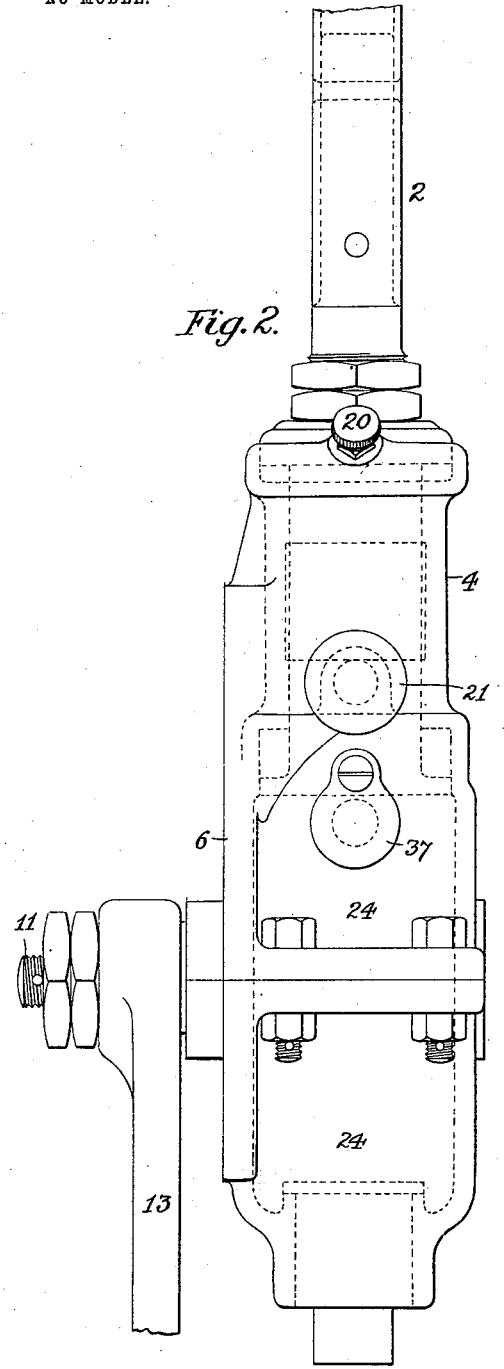
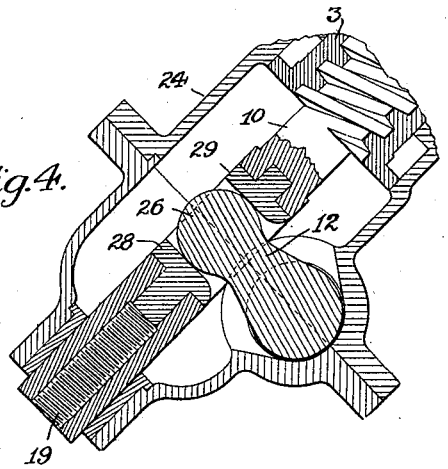
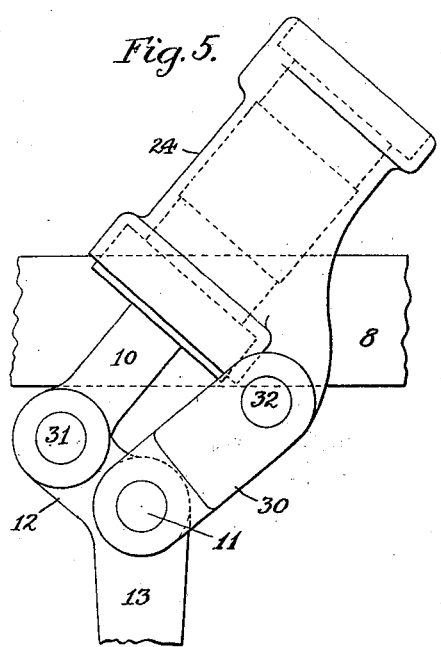
Witnesses,
C. Martin
J. Gawthorp.
Inventor,
Walter James Iden.
per Douglas Leechman
Attorney.

No. 754,068. PATENTED MAR. 8, 1904.
W. J. IDEN.
STEERING GEAR FOR MOTOR CARS.
APPLICATION FILED OCT. 13, 1902.
NO MODEL. 3 SHEETS—SHEET 3.

Witnesses,
C. Martin
F. Gawthorp.

Inventor,
Walter James Iden,
per, Douglas Leechman.
Attorney.

No. 754,068. Patented March 8, 1904.

UNITED STATES PATENT OFFICE.

WALTER J. IDEN, OF COVENTRY, ENGLAND.

STEERING-GEAR FOR MOTOR-CARS.

SPECIFICATION forming part of Letters Patent No. 754,068, dated March 8, 1904.

Application filed October 13, 1902. Serial No. 127,003. (No model.)

*To all whom it may concern:*

Be it known that I, WALTER JAMES IDEN, a subject of the King of Great Britain, residing at Coventry, in the county of Warwick, England, have invented certain new and useful Improvements in Steering-Gear for Motor-Cars, of which the following is a specification.

My invention relates to the steering-gear of motor-cars and the like in which a steering-pillar is turned about its axis by a wheel or other handle in order to deflect the steering road wheel or wheels through suitable levers, rods, and the like. My object is to provide a coupling between the first of such levers and the said pillar, in which wearing of the parts shall be very slow and readily compensated, the intrusion of dust and wet shall be prevented, and the retention of lubricant insured, backlash avoided, and strength secured. I dispense with pins, racks, and pinions, screws and sectors, slotted nuts, and such like coupling devices, actuating at a distance from the axis of the pillar; and my invention consists, essentially, in a screw-and-nut union, one member of which is adapted to be turned by the steering-handle, and the other member of which is non-rotative and coupled to the first lever and with which the said lever is adapted to be operated by the extending and contracting movements of the union in the direction of its axis.

In the accompanying drawings, Figure I is a vertical section, and Fig. II is a front elevation, of part of a steering-gear constructed according to my invention. Fig. III is an elevation showing the first lever mounted centrally. Figs. IV, V, VI, VII, and VIII show modified means for coupling the union to the first lever. Fig. IX is a general view in plan of the steering-gear. Figs. III, IV, V, VI, VII, VIII, and IX are drawn to a smaller scale than Figs. I and II.

Like numerals refer to like parts throughout the drawings.

Referring to Figs. I, II, and IX, I mount on the lower end of the steering-pillar 2 a nut 3 of suitable cylindrical form. This nut is mounted freely in a socket 4, preferably by means of an adjustable ball-bearing 5. The socket 4 is mounted in any convenient manner on the frame 8 of the vehicle, as by a bracket 6, adapted to be bolted at any desired angle. The nut 3 is adapted to receive the screw-threaded part 9 of a pin 10. The threads of the nut 3 and screw 9 preferably have a multiplicity of starts. The first lever is fulcrumed on an axis 11 in a plane at right angles to the axis of the union 3 10 and has one arm, 12, adapted to be moved by the pin 10, and the other arm, 13, adapted to transmit the movement to the steering road-wheels 42. The arm 12 is usually shorter than the arm 13 and may normally stand at or approximately at right angles to the axis of the union. It may be coupled to the pin 10 by any suitable means which will allow of the pin moving in a straight line, while the end of the arm moves in a curve; but I prefer the ball-and-socket joint shown. The ball 14 is formed on the end of the arm 12, and the socket 15 is formed in a split block 16 16' of preferably cylindrical external formation, mounted freely in a corresponding chamber 17, bored transversely through the pin 10. The upper part 16 of the block may bear directly against the top of the chamber; but the cross-bar of a T-piece 18 is preferably interposed between the lower part 16' of the block and the bottom of the chamber. The lower end of the pin 10 is bored to receive the tail of the said T-piece and is tapped to receive a screw-plug 19. By turning the plug 19 the fit of the socket 15 on the ball 14 may be readily adjusted and wear taken up. The socket 4 is preferably extended as a casing 24 to inclose the pin 10 and the arm 12. An oil-cup 20 is provided for the ball-bearing 5 and a grease-cup 21 for the union, while a swing-cap 37 is fitted for introducing lubricant to the interior of the casing 24. An air-vent may be formed at 22, and a passage may be provided at 23 to allow for the escape of superfluous grease in case so much lubricant is forced in as would otherwise be liable to choke the action of the screw and nut. Any suitable means may be provided for preventing the pin 10 rotating with the nut 3. Thus the mouth of the socket 15 may be slotted out only to the thickness of the arm 12, so that the lips 25 overlap the said arm, as shown.

The action is as follows: To deflect the steering road wheel or wheels 42, the pillar 2 is rotated through a suitable angle by its handle 43. The rotation of the pillar is necessarily accompanied by the rotation of the nut 3, and the rotation of the nut effects a longitudinal movement of the pin 10, and hence an angular movement of the first lever 12 13 about its fulcrum 11. The angular movement of the first lever 12 13 is transmitted to the steering road wheel or wheels 42 through any suitable connections 44. The device is preferably so designed that the center of the ball or the like lies as much to one side of the axis of the union when the car is running straight as it lies to the other side of the said axis when the steering is at full lock.

The arm 13 of the first lever may be set to either side of the arm 12, or, as shown in Fig. III, it may be set centrally. In Fig. IV the end of the arm 12 is provided with a disk 26, which is mounted between two hardened blocks 28 29, of which 28 takes the form of a T-piece and is adapted to be adjusted like the T-piece 18. In this case the disk 26 is adapted to move slightly along the faces of the slides, which are themselves fixed. A modification of this construction is shown in Figs. VII and VIII, where blocks 38 39 are adapted to slide transversely of the pin 10 and the block 38 is separate from the T-piece 18 after the manner of the device described with reference to Fig. I, and to secure a better connection between the parts a fast or well-fitted pin 40 is arranged coaxially of the disk 26 and engages in corresponding grooves 41 in the opposing faces of the said blocks 38 39.

Another modification is shown in Fig. V, where the first lever instead of being fulcrumed on a fixed axis 11 is pivoted to the end of a link 30 and the arm 12 is coupled to the pin 10 by an ordinary hinge-joint 31. The link 30 is jointed to the casing at 32, and by allowing the fulcrum 11 to move slightly to and from the pin 10 avoids the necessity for any movement of the end of the arm 12 transversely to the said pin.

In the further modification shown in Fig. VI the joint between the pin 10 and the arm 12 is made with a bolt 33, having circular ends adapted to turn in corresponding holes 34, bored in the end of the said arm, which is forked to receive the said pin. The middle portion 35 of the bolt is of square formation to engage and slide in a transverse rectangular slot 36, formed in the pin 10. The bolt 33 is thus left free to travel the necessary small amount at right angles to the axis of the union when the angle between the arm 12 and the pin 10 is varied in actuating the steering-gear.

It will be observed that ample bearings are provided for the nut 3 and for the coupling between the pin 10 and the arm 12 and that these bearings can be adjusted without dismantling any of the parts. The socket 4 and casing 24 effectually exclude dust and wet and at the same time serve to retain the lubricants. The nut 3 and screw 9 always have a large amount of surface in contact, and hence play (whether lateral or longitudinal) between the said nut and screw is reduced to a minimum, so that backlash and wear are both decreased and safety is assured by the increased inherent strength of the parts.

I do not confine myself strictly to the above description, but hold myself at liberty to make such modifications as fairly fall within the scope of my invention, and

What I claim as my invention, and desire to secure by Letters Patent of the United States, is—

1. In steering-gear for motor-cars, the combination of a first lever having a ball end, a screw-pin having a transverse chamber, a nut adapted to receive the said screw-pin, means for rotating the said nut, a block mounted in the said chamber and having a socket adapted to receive the said ball end.

2. In steering-gear for motor-cars, the combination of a first lever having a ball end, a screw-pin having a transverse chamber and a bored and tapped end, a nut adapted to receive the said screw-pin, means for rotating the said nut, a split block mounted in the said chamber and having a socket adapted to receive the said ball, a T-piece mounted in the said screw-pin and adapted to bear by its cross-bar against the said block and a plug adapted to screw into the said screw-pin and bear against the tail of the said T-piece.

In testimony whereof I have signed my name to this specification in the presence of two subscribing witnesses.

WALTER J. IDEN.

Witnesses:
  DOUGLAS LEECHMAN,
  F. GAWTHORP.